US010938994B2

(12) United States Patent
Wada et al.

(10) Patent No.: US 10,938,994 B2
(45) Date of Patent: Mar. 2, 2021

(54) BEAMFORMER AND ACOUSTIC ECHO CANCELLER (AEC) SYSTEM

(71) Applicant: Cypress Semiconductor Corporation, San Jose, CA (US)

(72) Inventors: Ted Wada, Irvine, CA (US); Ashutosh Pandey, Irvine, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/446,277

(22) Filed: Jun. 19, 2019

(65) Prior Publication Data

US 2019/0394338 A1 Dec. 26, 2019

Related U.S. Application Data

(60) Provisional application No. 62/819,835, filed on Mar. 18, 2019, provisional application No. 62/689,488, filed on Jun. 25, 2018.

(51) Int. Cl.
*H04M 9/08* (2006.01)
*H04B 3/23* (2006.01)
*G10L 21/0208* (2013.01)

(52) U.S. Cl.
CPC ......... *H04M 9/082* (2013.01); *G10L 21/0208* (2013.01); *H04B 3/23* (2013.01)

(58) Field of Classification Search
CPC .......... G06F 3/16; G06F 3/167; G10K 11/34; G10L 21/02; G10L 21/0208;

(Continued)

(56) References Cited

U.S. PATENT DOCUMENTS 5,410,595 A * 4/1995 Park .................. H04M 9/082
379/406.08
5,721,772 A * 2/1998 Haneda ............... H04M 9/082
379/345

(Continued)

FOREIGN PATENT DOCUMENTS

CA 2413217 A1 5/2004

OTHER PUBLICATIONS

International Search Report for International Application No. PCT/US19/38185 dated Sep. 10, 2019; 2 pages.

(Continued)

*Primary Examiner* — Gerald Gauthier

(57) ABSTRACT

Techniques for acoustic echo cancellation are described herein. In an example embodiment, a system comprises a speaker, a microphone array with multiple microphones, a beamformer (BF) logic and an acoustic echo canceller (AEC) logic. The speaker is configured to receive a reference signal. The BF logic is configured to receive audio signals from the multiple microphones and to generate a beamformed signal. The AEC logic is configured to receive the beamformed signal and the reference signal. The AEC logic is also configured to compute a vector of bias coefficients multiple times per time frame, to compute a background filter coefficient based on the vector of bias coefficients, to apply a background filter to the reference signal and the beamformed signal based on the background filter coefficient, to generate a background cancellation signal, and to generate an output signal based at least on the background cancellation signal.

28 Claims, 8 Drawing Sheets

(58) Field of Classification Search
CPC ..... G10L 21/0216; G10L 25/84; G10L 15/02; G10L 17/18; H04B 3/23; H04Q 9/00; H04L 29/12; H04L 1/1607; H04L 27/2636; H04M 1/00; H04M 9/08; H04M 9/082; H04R 29/00; H04R 1/40; H04R 3/005; H04R 3/04; H04R 29/005; G01R 33/4625; H03M 13/1111

USPC ........ 340/541; 370/316; 379/406.08, 406.01, 379/406.14; 381/66, 93; 700/53; 704/203, 208; 324/76.77; 706/20

See application file for complete search history.

(56) References Cited

U.S. PATENT DOCUMENTS

| | | | | |
|---|---|---|---|---|
| 6,006,175 | A * | 12/1999 | Holzrichter | A61B 5/0507 704/205 |
| 6,049,607 | A * | 4/2000 | Marash | H04R 3/005 379/406.08 |
| 6,424,960 | B1 * | 7/2002 | Lee | G06K 9/624 600/310 |
| 7,126,324 | B1 * | 10/2006 | Goncharenko | G01R 25/005 324/76.77 |
| 7,747,001 | B2 | 6/2010 | Kellermann et al. | |
| 7,831,036 | B2 * | 11/2010 | Beaucoup | H04M 9/082 379/406.08 |
| 8,184,801 | B1 | 5/2012 | Hamalainen | |
| 8,379,875 | B2 | 2/2013 | Hämäläinen | |
| 8,787,560 | B2 | 7/2014 | Buck et al. | |
| 8,818,002 | B2 | 8/2014 | Tashev et al. | |
| 8,942,382 | B2 | 1/2015 | Elko et al. | |
| 9,215,328 | B2 * | 12/2015 | Beaucoup | H04R 3/005 |
| 9,538,285 | B2 | 1/2017 | Rayala et al. | |
| 9,549,079 | B2 | 1/2017 | Bao et al. | |
| 9,595,977 | B2 * | 3/2017 | Landau | H03M 13/1137 |
| 9,659,576 | B1 | 5/2017 | Kotvis et al. | |
| 9,854,101 | B2 * | 12/2017 | Pandey | H04R 3/005 |
| 10,367,948 | B2 * | 7/2019 | Wells-Rutherford | H04M 9/082 |
| 10,522,167 | B1 * | 12/2019 | Ayrapetian | G10L 25/78 |
| 10,601,998 | B2 * | 3/2020 | Hera | H04B 1/3822 |
| 2002/0015500 | A1 * | 2/2002 | Belt | H04M 9/082 381/66 |
| 2004/0120511 | A1 * | 6/2004 | Beaucoup | H04M 9/082 379/406.05 |
| 2005/0149462 | A1 * | 7/2005 | Lee | G06K 9/624 706/20 |
| 2007/0263850 | A1 * | 11/2007 | Stokes | H04M 9/082 379/406.01 |
| 2008/0025527 | A1 * | 1/2008 | Haulick | H04M 9/082 381/93 |
| 2008/0071397 | A1 * | 3/2008 | Rawlings | G05B 13/048 700/53 |
| 2010/0207762 | A1 * | 8/2010 | Lee | G06K 9/00771 340/541 |
| 2010/0215184 | A1 * | 8/2010 | Buck | H04M 9/082 381/66 |
| 2013/0156210 | A1 * | 6/2013 | Shaw | G10K 11/16 381/66 |
| 2013/0332156 | A1 | 12/2013 | Tackin et al. | |
| 2014/0025374 | A1 * | 1/2014 | Lou | G10L 21/0216 704/203 |
| 2014/0056435 | A1 * | 2/2014 | Kjems | H04M 9/082 381/66 |
| 2014/0086425 | A1 | 3/2014 | Jensen et al. | |
| 2015/0078566 | A1 * | 3/2015 | Kumar | H04M 9/082 381/66 |
| 2015/0146868 | A1 * | 5/2015 | Tu | H04B 3/32 379/406.03 |
| 2015/0318000 | A1 | 11/2015 | Gao | |
| 2015/0371658 | A1 * | 12/2015 | Gao | G10L 21/0208 381/66 |
| 2016/0014786 | A1 * | 1/2016 | Chang | H04B 7/2041 370/316 |
| 2016/0057534 | A1 * | 2/2016 | Tsao | H04M 9/082 381/71.8 |
| 2016/0212507 | A1 * | 7/2016 | Du | H04L 1/08 |
| 2016/0238683 | A1 * | 8/2016 | Campagna | G01R 33/4625 |
| 2016/0240210 | A1 * | 8/2016 | Lou | G10L 21/0232 |
| 2017/0134849 | A1 | 5/2017 | Pandey et al. | |
| 2017/0195281 | A1 * | 7/2017 | Guo | G06F 17/142 |
| 2018/0102136 | A1 * | 4/2018 | Ebenezer | G10L 21/0232 |
| 2019/0102145 | A1 * | 4/2019 | Wilberding | H04N 21/43615 |
| 2019/0200143 | A1 * | 6/2019 | Jensen | H04R 25/505 |
| 2019/0348056 | A1 * | 11/2019 | Christoph | H04R 3/005 |
| 2019/0364375 | A1 * | 11/2019 | Soto | G10L 15/22 |
| 2019/0394338 | A1 * | 12/2019 | Wada | H04M 9/082 |
| 2020/0035214 | A1 * | 1/2020 | Tanaka | H04R 3/00 |

OTHER PUBLICATIONS

Written Opinion of the International Searching Authority for International Application No. PCT/US19/38185 dated Sep. 10, 2019; 9 pages.

"Optimizing Siri on HomePod in Far-Field Settings," Machine Learning Journal, vol. 1, Issue 12, Dec. 2018; 18 pages.

Martin, Rainer, "Acoustic Echo Cancellation for Microphone Arrays Using Switched Coefficient Vectors," Institute of Communications Systems and Data Processing, Nov. 2007, pp. 85-88; 4 pages.

Tsao, Yu, "Acoustic Echo Cancellation Using a Vector-Space-Based Adaptive Filtering Algorithm," IEEE Signal processing Letters, vol. 22, No. 3, Mar. 2015, pp. 351-355; 5 pages.

Wada, Ted S., "System Approach to Robust Acoustic Echo Cancellation Through Semi-blind Source Separation Bases on Independent Component Analysis," Georgia Institute of Technology, Aug. 2012, pp. 1-175; 175 pages.

Herbordt, W., "Joint Optimization of LCMV Beamforming and Acoustic Echo Cancellation," 2004 12th European Signal Processing Conference, IEEE, Sep. 2004, pp. 2003-2006; 4 pages.

Maruo, Marcos H., "Statistical Analysis of a GSC-based Jointly Optimized Beamformer-Assisted Acoustic Echo Canceler," IEEE International Conference on Acoustics, Speech and Signal Processing- Proceedings, May 2014, pp. 1-13; 13 pages.

* cited by examiner

BEAMFORMER AND ACOUSTIC ECHO CANCELLER (AEC) SYSTEM

PRIORITY

This application claims the priority and benefit of U.S. Provisional Application No. 62/689,488, filed on Jun. 25, 2018, and of U.S. Provisional Application No. 62/819,835, filed on Mar. 18, 2019, all of which are incorporated by reference herein in their entirety.

TECHNICAL FIELD

This disclosure relates to signal processing in acoustic echo canceller systems.

BACKGROUND

In audio processing systems, beamformer (BF) is a signal processing mechanism that directs the spatial response of a microphone array towards a target audio source. Examples of audio processing systems that use beamformers include, without limitation, hands-free phone sets, speakerphone sets, and speech recognition systems. A key issue with such systems is the proper processing of acoustic (sound) interferences.

For example, an acoustic audio signal (e.g., speech) played by a speaker device goes through a Room Impulse Response (RIR) and is captured by the microphones in a microphone array. The RIR is transfer function that characterizes the propagation of the acoustic signal in a confined space (e.g., inside a room, a vehicle, etc.) and typically produces an acoustic echo. Such acoustic echo is unwanted because it usually dominates the target acoustic signal. To cancel the unwanted acoustic echo, audio processing systems typically use some kind of Acoustic Echo Canceller (AEC) mechanism. However, AEC processing is computationally very expensive. This problem is exacerbated in systems with limited computational power, such as embedded systems (e.g., System-on-Chips, or SoCs) and Internet-Of-Things (IoT) devices that provide front-end processing for back-end automatic speech recognition systems (e.g., such as Amazon Alexa, Google Home, etc.)

DETAILED DESCRIPTION

Figure 1:
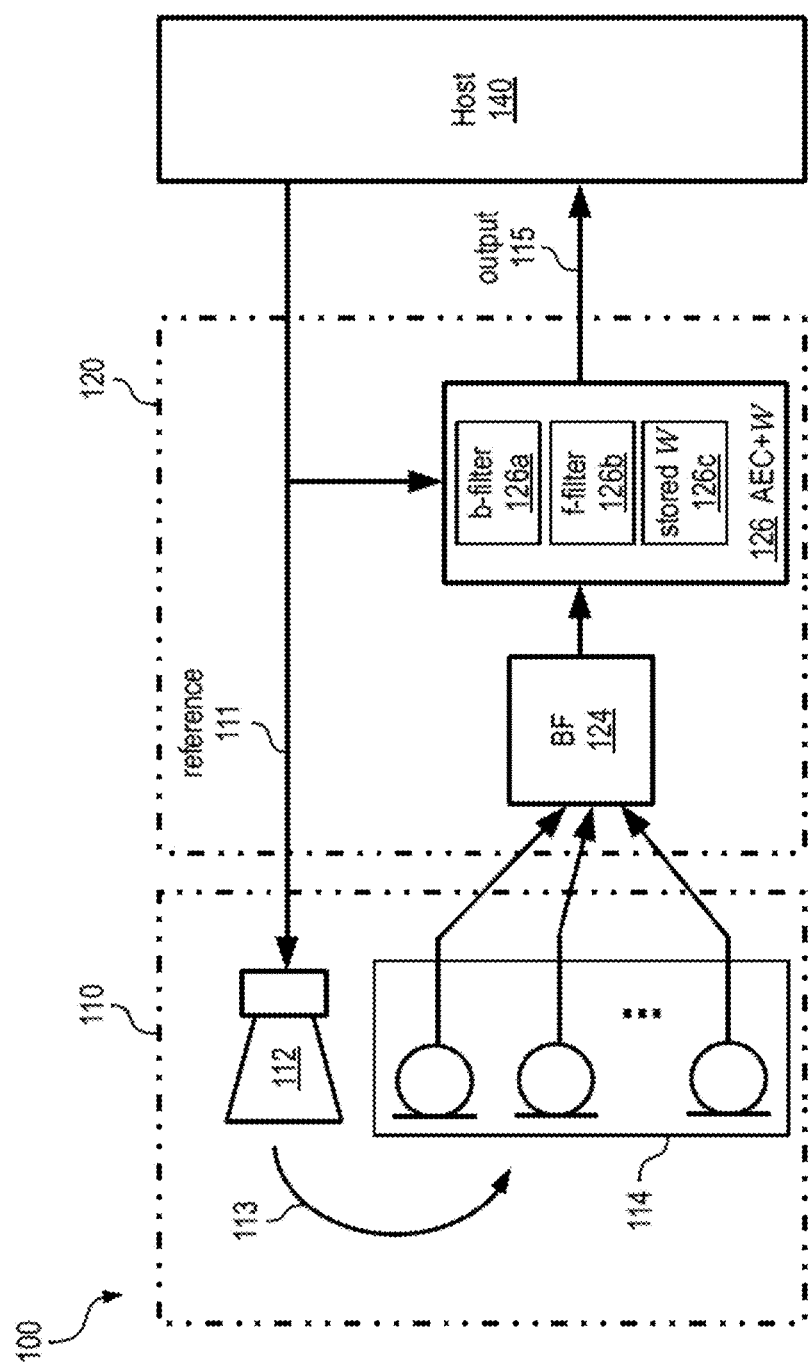
FIG. 1 illustrates an example system for acoustic echo cancellation, according to some embodiments.

The following description sets forth numerous specific details such as examples of specific systems, components, methods, and so forth, in order to provide a good understanding of various embodiments of the described techniques for acoustic echo cancellation after beamforming. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, step, operation, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for acoustic echo cancellation in devices that provide audio processing. Examples of such devices include, without limitation, personal computers (e.g., laptop computers, notebook computers, etc.), mobile computing devices (e.g., tablets, tablet computers, etc.), teleconferencing devices (e.g., speakerphones), mobile communication devices (e.g., smartphones, etc.), printed circuit board (PCB) modules configured for audio processing, System-on-Chip (SoC) semiconductor devices and multi-chip semiconductor packages, Internet-of-Things (IoT) wireless devices, and other similar electronic, computing, and on-chip devices for audio processing.

Beamformer (BF) and Acoustic Echo Canceller (AEC) are critical components in a front-end system that enhances audio signals for a back-end automatic speech recognition system, such as Amazon Alexa or Google Home. Generally, it is desirable to place the AEC before the BF in order to eliminate the need for the AEC to re-adapt whenever the BF direction changes. For example, a back-end automatic speech recognition system (which runs on the cloud or on a local computer) needs an audio signal that is as clean as possible. Typically, a microphone in a microphone array receives an acoustic (sound) wave and converts it to an analog audio signal, which is then digitized. However, the received acoustic wave may have been interfered with by nearby devices (e.g., a TV set that is on, etc.) or by acoustic echo from a speaker device. (As used herein, "speaker device" and "speaker" refer to an electroacoustic device configured to transform electric signals into acoustic/sound waves.) For instance, a person (whose speech needs to be voice-recognized) may be talking while a speaker is playing back music or other multi-media content. Since such playback is also captured by the microphone array along with the speech of the talker, an AEC is used to cancel the interference signal before a BF is used to target the received signal to the talker.

One drawback of this AEC-before-BF (AEC+BF) approach is that it requires one AEC instance per microphone and is computationally expensive for an embedded system with limited hardware resources. For example, in smartspeaker applications that need to recognize and respond to voice commands, the acoustic echo from a speaker usually dominates the target speech signal due to the proximity of the speaker to the microphone array. In such a case, an AEC+BF approach is widely preferred over an AEC-after-BF (BF+AEC) approach for optimal cancellation performance. However, in some operational contexts echo cancellation needs to be implemented on an edge device that is the entry point into IoT cloud-based services. Such edge devices typically do not have the capability for extensive computations. Thus, in such operational contexts the limitation in computational resources is the overriding factor, and the BF+AEC approach becomes the choice for echo cancellation. In the BF+AEC approach, a beamformed audio signal would include any undesirable playback or echo interference, and thus the AEC needs to efficiently re-adapt itself every time the BF re-targets the received signal (e.g., to a different talker).

To address this re-adaptation issue in the BF+AEC approach, the techniques described herein provide for AEC with adaptive filter coefficients that are pre-computed at selected spatial directions. The pre-computed filter coefficients are stored as a matrix in memory and are re-used for subsequent adaptations when the BF changes its direction. The stored filter coefficients provide prior information for faster AEC adaptation not only after the change in BF direction but also after the change in room impulse response (RIR) (e.g., due to movement of talkers). The techniques described herein also provide for background filtering with multiple filter adaptations per time frame, and for foreground filtering with one filter adaptation per time frame. Used in this way, the background-foreground filtering described herein achieves both fast convergence and noise robustness, which are otherwise mutually-opposite factors in adaptive filtering. In this manner, the techniques described herein allow for practical BF+AEC solutions that can still achieve the performance very close to that of AEC+BF solutions even in systems with limited computing power.

A beamformed signal y is generalized herein as the output of a function $f$ that applies some beamforming filter to the unprocessed multi-channel microphone signal d, per Equation (1):

$$y = f_{BF}(d) \quad (1)$$

According to the techniques for echo cancellation described herein, AEC is applied to the BF output (beamformed) signal y while adaptively optimizing the quantity in Equation (2):

$$w = Wa + b \quad (2)$$

where w is a vector of the combined AEC filter coefficients of length L, W is a matrix of AEC filter coefficients of size L×N that holds N filters pre-computed at several BF directions and stored in memory or other persistent storage device, b is a vector of "bias" filter coefficients of length L, and a is a vector of mixing coefficients of length N (e.g., w is a linear combination of previously computed filters in W, each filter of which is weighted by the corresponding mixing coefficient in a, and the bias filter b). More specifically, the vector w of the combined AEC filter coefficients is optimized during operation (e.g., in real time) by minimizing the residual echo energy per Equation (3):

$$E[e(n)^2] = E[(y(n) - w(n)^T x(n))^2] \quad (3)$$

where e is the residual echo, y is the BF output signal, x is the reference signal (e.g., a signal provided to a speaker), n is the time index, and E[ ] is the expectation (averaging) operator.

Due to fixed speaker-microphone geometry and the proximity of the speaker to the microphone array, a major part of the echo path for smartspeaker applications is attributed to direct path of sound and to early reflections inside the speaker-microphone enclosure. This can be generalized for most practical applications where it can be assumed that the speaker and the microphone array locations remain the same during their usage, and that the reverberation condition in a room is benign enough to not require audio enhancement algorithms beyond beamforming and AEC. Then it should be possible to calibrate the matrix W offline during manufacturing time, upon device start-up, or on demand by the end-user's command. In fact, it should also be possible to update the matrix W in real time to keep up with the changes in the RIR as long as enough computational resources are available. How often the matrix W should be updated will ultimately depend on the application scenarios, where the techniques described herein should be able to accommodate a majority of those cases.

Assuming that the matrix W can be kept constant (e.g., per particular audio processing device and/or a specific type thereof), one way of estimating the vectors a and b according to techniques described herein is to jointly optimize them through adaptive filtering. This results in the optimal overall filter coefficients vector w at the cost of increased computational complexity, which may be considerable depending on how often the adaptive filtering is carried out over time. Adaptive filtering is a technique that continuously adjusts the filter coefficients of the AEC to reflect the changing acoustic environment (e.g., when a different talker starts to speak, when a microphone or a speaker is physically moved, etc.) to achieve as optimally filtered output as possible (e.g., by minimizing the residual echo energy across time per Equation (3)). It may be implemented sample-wise in the time domain or block-wise in the frequency domain across time. Another simplified approach, according to the techniques described herein, is to compute the vector a along with the matrix W offline, store a and W in one or more look-up tables, and then obtain the mixing coefficients in a for other in-between directions not covered by W via interpolation. The vector a may be real or complex valued depending on which domain, time or frequency, the adaptive filtering is implemented. Any small variations in echo path that cannot be explained by a mixture of the filter coefficients in W are then modeled through the vector of bias coefficients b via adaptive filtering.

Traditionally, the two main opposing factors in adaptive filtering are the convergence speed and the noise robustness, where one is often sacrificed to achieve the other. According to the techniques described herein, this trade-off can be overcome by background-foreground filtering and multiple adaptations per time frame, both of which would normally be cost prohibitive for AEC+BF but can be leveraged by BF+AEC as described herein. Background-foreground filtering is an adaptive filtering technique that involves two separate adaptive filters ("background" and "foreground") that are combined properly to maximize the system performance. In general, the background filter is designed to be aggressive to adapt quickly and cancel as much echo as possible over a short time period at the cost of reduced noise stability, whereas the foreground filter is tuned conservatively to provide stable and optimal output from long-time perspective at the cost of slow convergence speed.

In order to minimize the computational cost of BF+AEC adaptive filtering, the techniques described herein provide that only the background filter is adapted multiple times within a given time frame while using a subset of the pre-computed AEC filter coefficients. In particular, Equation (4):

$$w_b(n) = W(\theta)a(\theta) + b(n) \qquad (4)$$

represents the background filter coefficients, and Equation (5):

$$e_b(n) = y(n) - w_b(n)^T x(n) \qquad (5)$$

represents the background filter output, where $w_b(n)$ is the background filter coefficients vector, $W(\theta)$ is a subset of the matrix of pre-computed filter coefficients selected based on the direction angle $\theta$, $a(\theta)$ is a subset of the vector of mixing coefficients selected based on the direction angle $\theta$, $b(n)$ is a vector of bias filter coefficients, $e_b(n)$ is the background filter output signal, $y(n)$ is the beamformed output signal from the BF, $x(n)$ is the reference signal provided to the speaker, and $n$ is the time index. The dependency of the matrix $W$ and the vector $a$ on BF direction is indicated explicitly by the direction angle $\theta$ (which may be in terms of azimuth angle, elevation angle, or both azimuth and elevation angles). Significant saving in computational cost can be achieved by updating only the vector $b$ multiple times per time frame via adaptive filtering while using only the AEC filters in $W$ and the mixing coefficients in $a$ that were previously computed in proximity of the intended target for filtering (e.g., two nearest filters that bound the target direction). On the other hand, the foreground filter, with its own filter coefficients, is adapted just once per time frame (or less frequently than the background filter). In particular, Equation (6):

$$e_f(n) = y(n) - w_f(n)^T x(n) \qquad (6)$$

represents the foreground filter output, where $e_f(n)$ is the foreground filter output signal, $y(n)$ is the beamformed signal output from the BF, $x(n)$ is the reference signal provided to the speaker, and $n$ is the time index. According to the techniques described herein, an output from the two filters that minimizes the residual echo energy (per Equation (3)) may be selected as the AEC signal output $e(n)$. For example, in some embodiments the smaller one of the $e_b(n)$ and $e_f(n)$ output signals may be selected in order to maximize the echo cancellation. In other embodiments, a linear combination of the $e_b(n)$ and $e_f(n)$ output signals may be generated by assigning to each output signal an appropriate weight.

In general, the techniques described herein provide that the vector of bias coefficients $b$ is being updated several times per time frame, while the foreground coefficients are updated less frequently (e.g., once per time frame). The background filter processing is more aggressive (e.g., its filter coefficients are being adapted multiple times per time frame, or its adaptation step size is set relatively large) in order to converge faster than the foreground filter. On the other hand, the foreground filter processing is more conservative (e.g., its filter coefficients are being adapted at least once per time frame but less frequently than the background filter coefficients). In this manner, the foreground filter is able to keep converging to the optimal solution even in the presence of noise, while the background filter, with the way its vector $b$ of bias coefficients is updated, is able to capture any fast variations and dynamics in the room. There are other ways to implement the background-foreground filtering besides what is described herein; nonetheless, it is typically needed to handle barge-in and double-talk scenarios and should be present in a truly robust system. ("Double-talk" is a scenario that occurs during teleconferencing when a local/near-end talker and a remote/far-end talker speak simultaneously such that the local and the remote speech signals are captured by the local microphone at same time. "Barge-in" is a similar scenario as double-talk, except that a live remote talker is replaced by a device/machine that may be playing back either the captured speech signal itself or a multimedia signal such as music.)

In terms of choosing the overall output signal of the BF+AEC system, one type of selection criteria can be the smallest residual signal energy—that is, either the background output signal $e_b(n)$ or the foreground output signal $e_f(n)$ with the smaller energy (e.g., the weaker signal) can be selected in order to cancel as much echo as possible. If the adaptive filtering is implemented in the frequency domain, then the output selection may be performed per frequency bin or subband. In order to get a smoother output signal, a different type of selection criteria can be used—for example, a linear combination of the $e_b(n)$ and $e_f(n)$ output signals can be used by giving one output signal more weight than the other. Alternatively, or in addition to, a more elaborate algorithm can be used to control the BF+AEC system and select its output signal based on the $e_b(n)$ and $e_f(n)$ output signals, including other existing background-foreground filtering techniques for achieving fast convergence and/or noise robustness.

By combining the procedures described above, the techniques for echo cancellation described herein provide locally and globally optimal signal output from both spatial and temporal points of views. From the spatial perspective, the described techniques capture and utilize multiple AEC filters that are sampled from the acoustic space and not just from one echo path. From the temporal perspective, the described techniques can track slow and fast variations in the echo path between the speaker and the microphone array to simultaneously achieve quick adaptation and noise stability.

FIG. 1 illustrates a system 100 for acoustic echo cancellation, according to an example embodiment. System 100 includes a speaker-microphone assembly 110 that is coupled to an audio processing device 120, which is coupled to a host 140. In some embodiments (e.g., such as teleconferencing devices), the components of system 100 may be integrated into the same housing as a standalone apparatus. In other embodiments (e.g., smartspeaker systems), the components of system 100 may be separate elements that are coupled over one or more networks and/or communication lines. Thus, system 100 in FIG. 1 is to be regarded in an illustrative rather than a restrictive sense.

Speaker-microphone assembly 110 includes at least one speaker 112 and microphone array 114 that are disposed in acoustic proximity, such that the microphone array can detect acoustic waves from wanted sound sources (e.g., human speech) and from unwanted sound sources (e.g., such as acoustic echo 113 from speaker 112). Speaker 112 is configured to receive an analog audio signal from audio processing device 120, and to emit the audio signal as an acoustic wave. Microphone array 114 includes multiple microphones that are configured to receive acoustic waves from various sound sources and to transform the received acoustic waves into analog audio signals that are sent to audio processing device 120. In some embodiments (e.g., smartphones), speaker 112 and microphone array 114 may be integrally formed as the same assembly 110. In some embodiments, (e.g., teleconferencing devices), speaker 112 and microphone array 114 may be separate components that are disposed on a common substrate (e.g., a PCB) mounted within, or on, a housing of assembly 110. In yet other embodiments, assembly 110 may not have a housing but may be formed by virtue of the acoustic proximity of speaker 112 to microphone array 114.

Audio processing device 120 includes BF logic 124 and AEC+W logic 126. As used herein, "logic" refers to hardware block(s) having one or more circuits that include various electronic components configured to process analog and/or digital signals and to perform one or more operations in response to control signal(s) and/or firmware instructions executed by a processor or an equivalent thereof. Examples of such electronic components include, without limitation, transistors, diodes, logic gates, state machines, micro-coded engines, and/or other circuit block(s) and analog/digital circuitry that may be configured to control hardware in response to control signals and/or firmware instructions. In some embodiments, audio processing device 120 may be a single-chip integrated circuit (IC) device manufactured on a semiconductor die or a single-chip IC that is manufactured as a System-on-Chip (SoC). In other embodiments, audio processing device 120 may be a multi-chip module encapsulated in a single semiconductor package or multiple semiconductor packages disposed or mounted on a common substrate, such as a PCB. In some embodiments, BF logic 124 and AEC+W logic 126 may be implemented as hardware circuitry within a digital signal processor (DSP) of audio processing device 120. In various embodiments, audio processing device 120 may include additional components (not shown), such as audio input/output (I/O) logic, a central processing unit (CPU), memory, and one or more interfaces to connect to host 140.

Host 140 is coupled to communicate with audio processing device 120. In some embodiments, host 140 may be implemented as a standalone device or as a computing system. For example, host 140 may be implemented on-chip with audio processing device 120 as a SoC device or an Internet of Things (IoT) edge device. In another example, host 140 may be implemented as a desktop computer, a laptop computer, a teleconferencing device (e.g., a speakerphone), etc. In other embodiments, host 140 may be implemented in a networked environment as a server computer or a server blade that is communicatively connected to audio processing device 120 over one or more networks.

According to the techniques described herein, audio processing device 120 is configured to provide BF+AEC echo cancellation based on a pre-computed matrix W of filter coefficients, a vector a of mixing coefficients, and a vector b of bias filter coefficients. For example, audio processing device 120 is configured to: compute the vector b of bias coefficients multiple times per time frame; compute a background filter coefficient $w_b(n)$ based on the vector b of bias coefficients, the pre-computed matrix W of filter coefficients, and the vector a of mixing coefficients; apply a background filter based on the background filter coefficient $w_b(n)$ to generate a background cancellation signal $e_b(n)$; and generate an output signal e(n) based at least on the background cancellation signal $e_b(n)$. In some embodiments, audio processing device is also configured to apply a foreground filter based on foreground filter coefficients $w_f(n)$ to generate a foreground cancellation signal $e_f(n)$ and to select (or otherwise determine) the output signal e (n) based on both the background cancellation signal $e_b(n)$ and the foreground cancellation signal $e_f(n)$.

In operation, audio processing device 120 receives audio data (e.g., a series of bytes) from host 140. The audio data may be multi-media playback or far-end speech. Audio processing device 120 (e.g., one or more circuits thereof) ultimately converts the received audio data into an analog audio reference signal 111 that is sent to speaker 112. The microphones in microphone array 114 pick up acoustic waves from near-end speech as well as acoustic echo 113 from speaker 112. The microphones in microphone array 114 convert the received acoustic waves into corresponding analog audio signals that are sent to audio processing device 120. Audio processing device 120 (e.g., one or more circuits thereof) receives the analog audio signals and converts them into modulated digital signals that are sent to BF logic 124. BF logic 124 applies beamforming on the modulated digital signals to combine them into a beamformed signal. For example, BF logic 124 may apply time delay compensation to the digital signal from each microphone, in order to compensate for the relative time delays between the microphone signals that may be due to the position of the acoustic source relative to each microphone. BF logic 124 may also be configured to attenuate the digital signals from some of the microphones, to amplify the digital signals from other microphones, and/or to change the directionality of the digital signals from some or all of the microphones. In some embodiments, BF logic 124 may also use signals received from sensors in microphone array 114 in order to track a moving talker, and to adjust the digital signal from each microphone accordingly. The BF logic 124 then sends the generated beamformed signal to AEC+W logic 126 along with its direction angle θ.

According to the techniques described herein, AEC+W logic 126 is configured to apply background filtering logic 126a and foreground filtering logic 126b on the reference signal 111 and on the beamformed signal received from BF logic 124, in order to generate the output signal 115. For example, AEC+W logic 126 continuously computes a vector b of bias coefficients multiple times per time frame. AEC+W logic 126 then computes a background filter coefficient $w_b(n)$ based on the current vector b, on matrix W of pre-computed filter coefficients 126c that are stored in one or more look-up tables, and on vector a of mixing coefficients that may also be stored locally. AEC+W logic 126 then applies background filter logic 126a based on the background filter coefficient $w_b(n)$ and foreground filter logic 126b based on the foreground filter coefficient $w_f(n)$, in order to generate background cancellation signal $e_b(n)$ and foreground cancellation signal $e_f(n)$, respectively. AEC+W logic 126 then generates the output signal e (n) 115 based on the background cancellation signal $e_b(n)$ and the foreground cancellation signal $e_f(n)$, e.g., by selecting one of the cancellation signals (e.g., based on residual signal energy) or by applying some other selection criteria based on a combination of both cancellation signals. The generated output signal 115 is then sent for further processing to host 140.

In some embodiments, the matrix W of filter coefficients 126c and the vector a of mixing coefficients may be periodically re-computed and updated. For example, AEC+W logic 126 (and/or another logic block in audio processing device 120) may be configured to re-compute the matrix W and the vector a in response to the end-user's command to re-calibrate the device to best match a particular acoustic environment.

Figure 2:
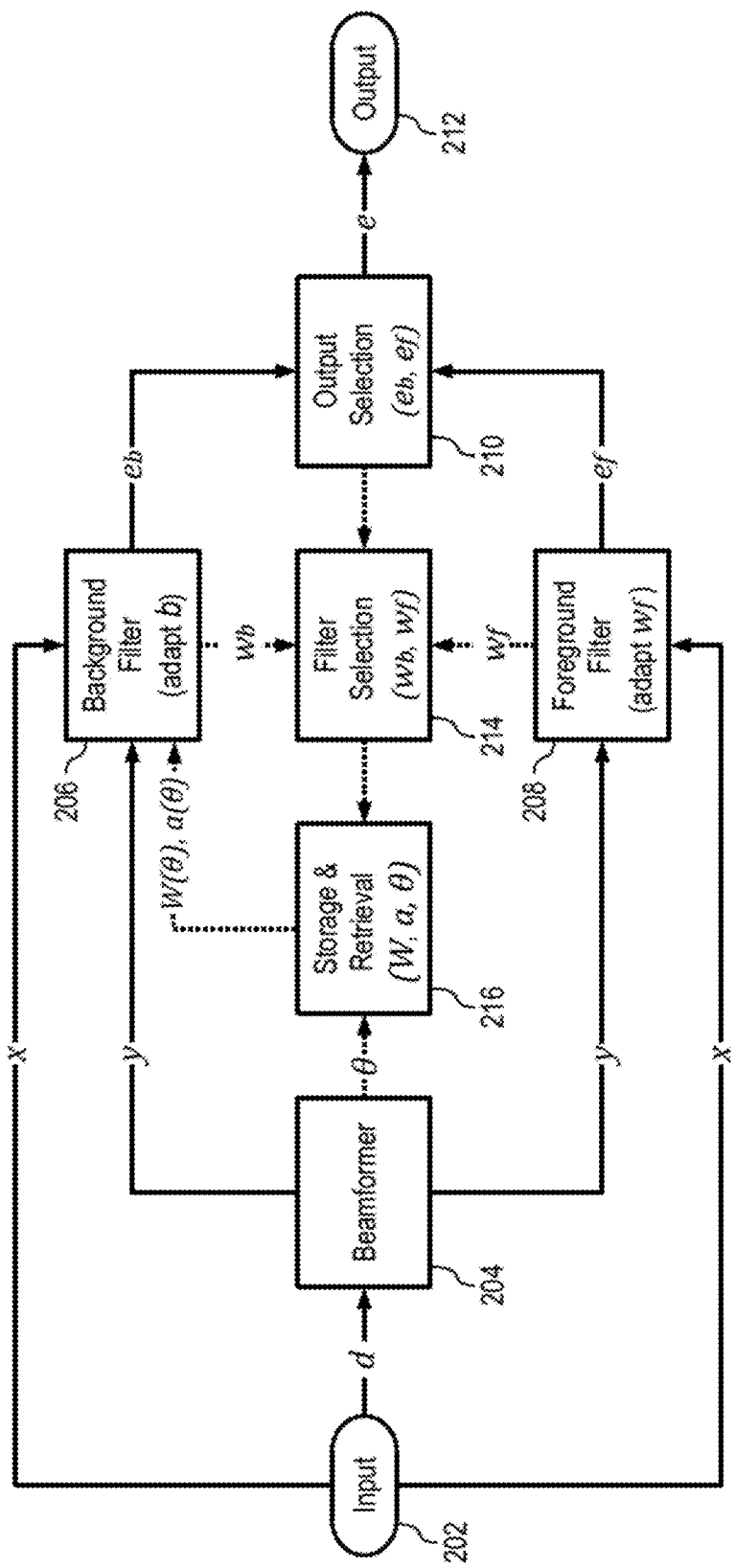
FIG. 2 illustrates a flow diagram of a method for acoustic echo cancellation, according to example embodiments.

FIG. 2 illustrates a flow diagram of an example method for acoustic echo cancellation, according to the techniques described herein. The operations of the method in FIG. 2 are described below as being performed by a BF logic and an AEC logic (e.g., such as BF logic 124 and AEC+W logic 126 in audio processing device 120 of FIG. 1). It is noted, however, that various implementations and embodiments may use various, and possibly different, components to perform the operations of the method in FIG. 2. For example, in various embodiments various semiconductor devices—e.g., a SoC, a field programmable gate array (FPGA), a programmable logic device (PLD), an Application Specific Integrated Circuit (ASIC), or other integrated circuit device—may be configured with firmware instructions which, when executed by a processor and/or other hardware components (e.g., microcontrollers, state machines, and the like), are operable to perform the operations of the method in FIG. 2. In another example, in various embodiments an IC device may include a single-chip or multi-chip audio controller configured to perform the operations of the method in FIG. 2. Thus, the description hereinafter of the method in FIG. 2 as being performed by a BF logic and an AEC logic in an audio processing device, is to be regarded in an illustrative rather than a restrictive sense.

Referring to FIG. 2, a multi-channel microphone signal d is provided to a BF logic, and a reference signal x is provided to an AEC logic of an audio processing device, per input operation 202. For example, a reference signal that is otherwise provided for emission to a speaker, is continuously provided to the AEC logic of the audio processing device.

In operation 204, a BF logic of the audio processing device generates a beamformed signal y from the multi-channel microphone signal d. For example, the BF logic may receive modulated digital signals associated with corresponding microphones of a microphone array that is in acoustic proximity with the speaker (which receives the reference signal x). The BF logic then performs beamforming on the modulated digital signals to combine them into the beamformed signal y. As part of the beamforming processing, the BF logic may apply time delay compensation to the digital signal from each microphone, may attenuate the digital signals from some of the microphones, may amplify the digital signals from other microphones, and/or may change the direction of the digital signals from some or all of the microphones. In some embodiments, the BF logic may also use signals received from sensors in the microphone array in order to track a moving talker, and to adjust the digital signal from each microphone accordingly. The BF logic then sends the generated beamformed signal y and its direction angle θ to the AEC logic for further processing.

In operation 206, the AEC logic applies a background filter to the beamformed signal y and to the reference signal x in order to generate a background filter output/cancellation signal $e_b$. For example, based on the direction angle θ, the AEC logic retrieves a subset of the matrix W of precomputed filter coefficients and a subset of the vector a of mixing coefficients from one or more local look-up tables. The AEC logic then computes a background filter coefficient $w_b$ based on the current vector b and on the retrieved matrix W and vector a values, e.g., in accordance with Equation (4) above. The AEC logic then applies a background filter logic to the beamformed signal y and the reference signal x based on the background filter coefficient $w_b$, e.g., in accordance with Equation (5) above, in order to generate the background filter output/cancellation signal $e_b$. Then, the AEC logic provides the generated background filter output/cancellation signal $e_b$ as input to operation 210, and may also periodically provide the computed background filter coefficient $w_b$ as input to operation 214.

In operation 208, the AEC logic applies a foreground filter to the beamformed signal y and to the reference signal x in accordance with Equation (6) above, in order to generate the foreground filter output/cancellation signal $e_f$. Then, the AEC logic provides the generated foreground filter output/cancellation signal $e_f$ as input to operation 210, and may also periodically provide the computed foreground filter coefficient $w_f$ as input to operation 214.

In operation 210, the AEC logic generates the output signal e based on the background filter output/cancellation signal $e_b$ and the foreground filter output/cancellation signal $e_f$. For example, in some embodiments the AEC logic may select the cancellation signal (either $e_b$ or $e_f$) with the lower residual signal energy as the output signal e. In other embodiments, the AEC logic may generate the output signal e by giving each of cancellation signals $e_b$ or $e_f$ different weights and then combining them accordingly. In yet other embodiments, the AEC logic may apply even more complicated algorithms to generate the output signal e from cancellation signals $e_b$ and $e_f$. The generated output signal e is then sent to a host, per output operation 212.

In some embodiments, the AEC logic may also perform operations 214 and 216 to update the matrix W of filter coefficients and/or the vector a of mixing coefficients. Operations 214 and 216 may be performed once in a while (e.g., during device bring-up after manufacturing) or periodically on demand (e.g., during a calibration procedure initiated by the end-user's command). In addition, or alternatively, operations 214 and 216 may be performed concurrently with some or all of operations 202, 204, 206, 208, 210 and 212 of the method in FIG. 2. Update procedures may be carried out offline by playing out a calibration signal (e.g., during device bring-up), or may be implemented during everyday usage behind the scene. For example, an existing filter stored in W may be replaced in real time if the new filter, $w_b$ or $w_f$, achieves more cancellation when the direction angle θ coincides with that of the filter in memory. Also, another BF+AEC process may be implemented concurrently or in sequence with the main process solely for the update purpose. More specifically, while the task of the main BF+AEC process is to provide the actual output to operation 212, that of the extra process is to periodically update the matrix W as its own BF sweeps through the target angles. A double-talk detector may be implemented in such a scenario to avoid updating the stored filters during double talk. If there is not enough computational resources for a second BF+AEC process, then certain restrictions can be enforced to allocate the resources for the second process (e.g., processing time may be diverted from the main process to the second process after the main BF+AEC has sufficiently converged and stabilized).

In operation 214, the AEC logic selects one of the background filter coefficient $w_b$ or the foreground filter coefficient $w_f$, which is provided to operation 216. Selection may simply be based on operation 210 such that a filter with more cancellation than the other is chosen, or it may involve more stringent criteria to ensure that the best AEC filter coefficients are stored in memory. In operation 216, the AEC logic receives as input the filter coefficient selected in operation 214 and the direction angle θ received from operation 204. During the storage process, the AEC logic updates the matrix W of filter coefficients and/or the vector a of mixing coefficients saved in memory. Replacement of pre-existing W and a may be forced without any restriction (i.e., complete refresh), or it may be carried out only if a new filter meets certain criteria (e.g., the new filter achieves more cancellation than the old filter). During the retrieval process, a subset of the matrix W and the vector a corresponding to the direction angle θ is provided as input to operation 206. In this manner, the AEC logic uses operations 214 and 216 to periodically update and continuously utilize the spatial perspective of the audio signal that is being processed.

In contrast to conventional AEC processing, the techniques for acoustic echo cancellation described herein provide significant improvements that make it possible to apply BF+AEC in embedded systems, edge devices, and other systems with limited computing power. For example, in conventional AEC+BF processing, allocation of one AEC per microphone is too costly because application of background-foreground filtering for noise stability would double the already heavy computational load. In contrast, the techniques described herein provide a practical, robust BF+AEC solution with background and foreground filtering for systems/devices with limited computing power.

One aspect of improvement, per the techniques described herein, is how the computed AEC filter coefficients and the mixing coefficients (e.g., matrix W and vector a, respectively) are updated and re-used as a function of BF direction change (e.g., a change in the direction angle θ). This is a simplification of conventional adaptive filtering algorithms because the filter coefficients in W and the mixing coefficients in a are updated separately from the bias filter coefficients in b and much less often than normally, but still with full optimization strategy. Further, this aspect of improvement provides a guideline of how many filters, N, should be used (e.g., only 6 to 8 filters would be sufficient for full room coverage, in some embodiments). Another aspect of improvement, per the techniques described herein, is how background filtering is incorporated in the described BF+AEC solution. The matrix of filter coefficients W and the vector of mixing coefficients a are utilized only by the background filter that is adapted multiple times per time frame in order to estimate the vector of bias coefficients vector b. Further, the final BF+AEC output signal e is selected from among, or based on, the output of the background and the foreground filters. In this manner, the techniques described herein achieve fast convergence and noise robustness at same time, which allows for a practical implementation of BF+AEC processing on systems/devices with limited computing power.

FIGS. 3A-3E illustrate diagrams of a simulation study that was carried out to verify the effectiveness of a proposed solution based on the techniques for AEC described herein. In general, such simulation studies are reliable mechanisms for predicting signal processing results and are often used as the first step in building practical solutions in the digital signal processing area.

Figure 3A:
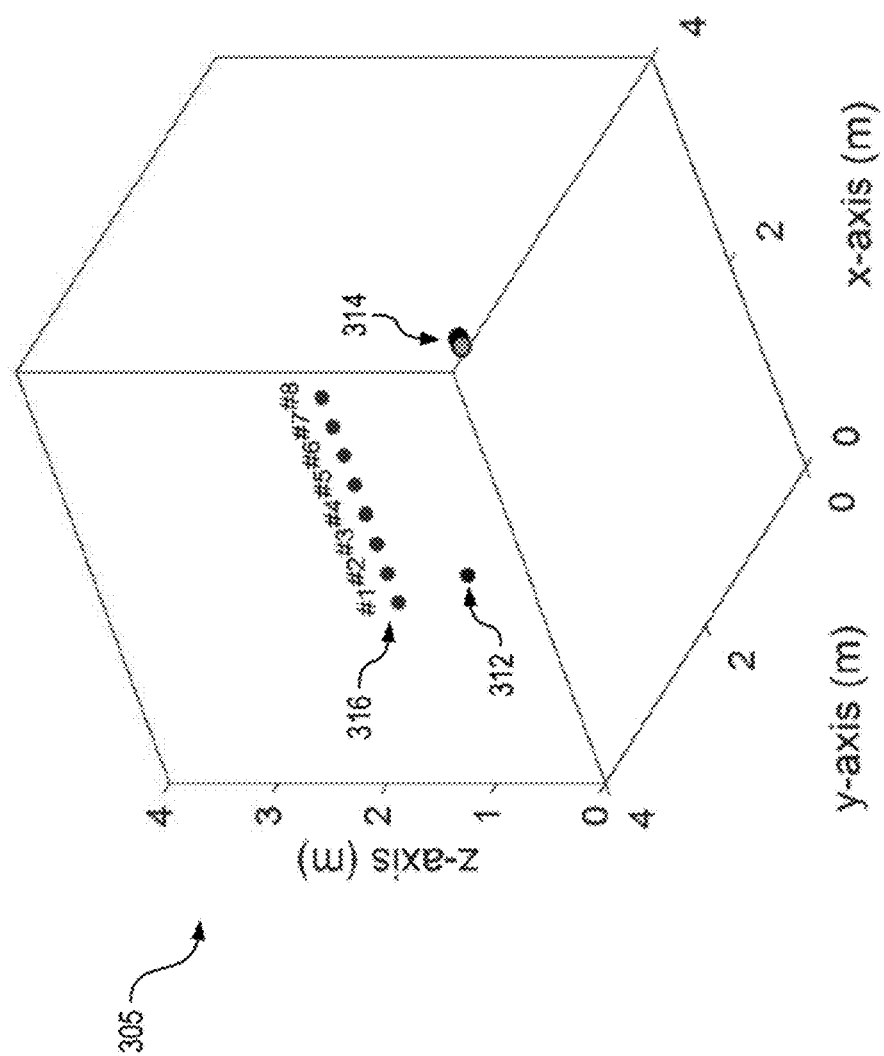
FIGS. 3A-3E illustrate various diagrams of a simulation study reflecting the described techniques for acoustic echo cancellation.
Figure 3B:
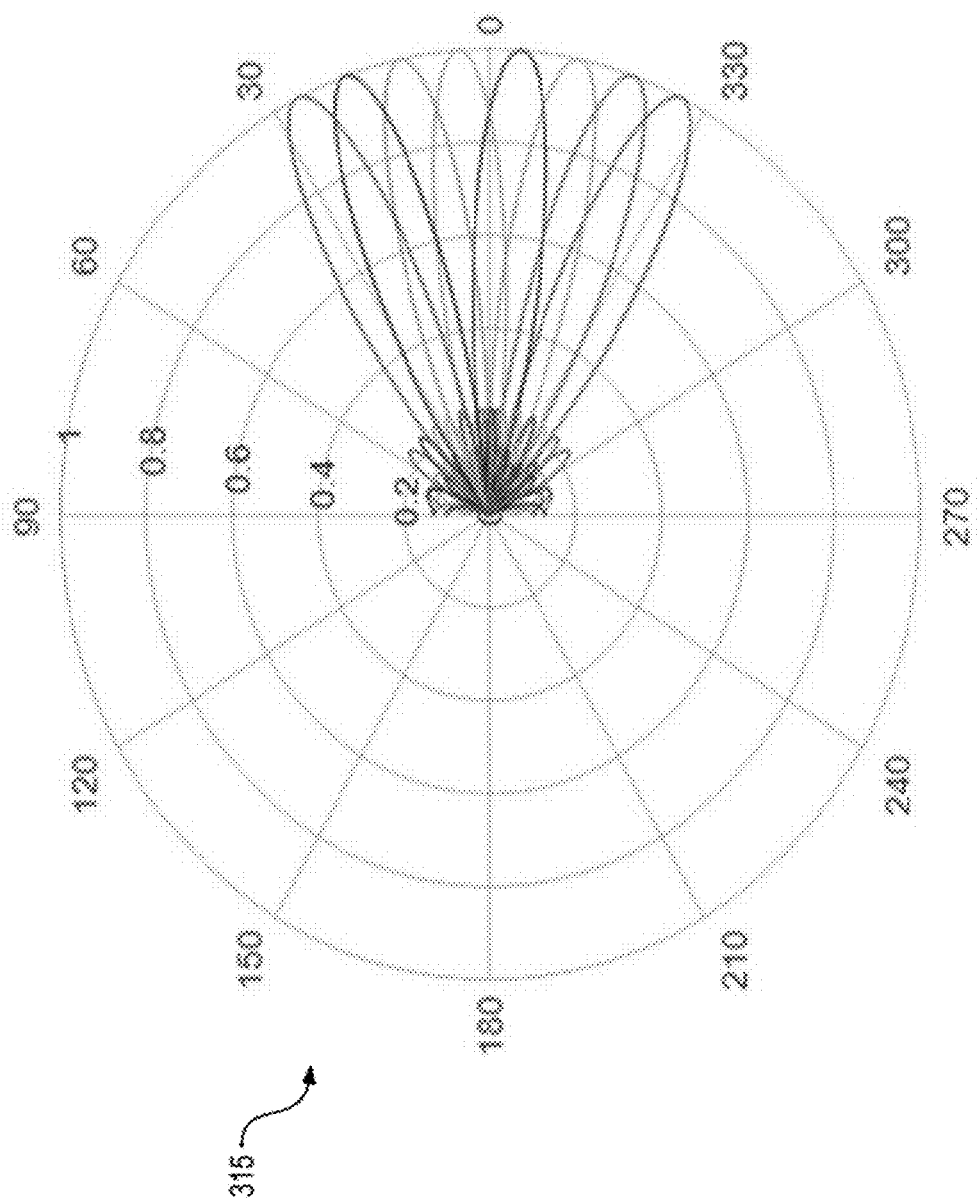

FIG. 3A illustrates a schematic diagram of spatial arrangement 305 used in the simulation study. Arrangement 305 includes a speaker 312, an 8-element linear microphone array 314, and eight sound targets 316 (numbered #1 to #8), all inside a 4 m×4 m×4 m room with reverberation time of 128 msec (e.g., 2048 samples @ 16 kHz). In arrangement 305, the number of filters, N, of the simulated AEC logic is set equal to 2, where the AEC filters computed when the BF is directed towards targets #1 and #8 (i.e., at the edges of BF coverage in arrangement 305) are stored in the matrix W. FIG. 3B illustrates polar plot 315 of directivity pattern of a BF designed to point towards the targets 316, in the arrangement 305 of FIG. 3A, which shows roughly 60° zone coverage by the BF.

Figure 3C:
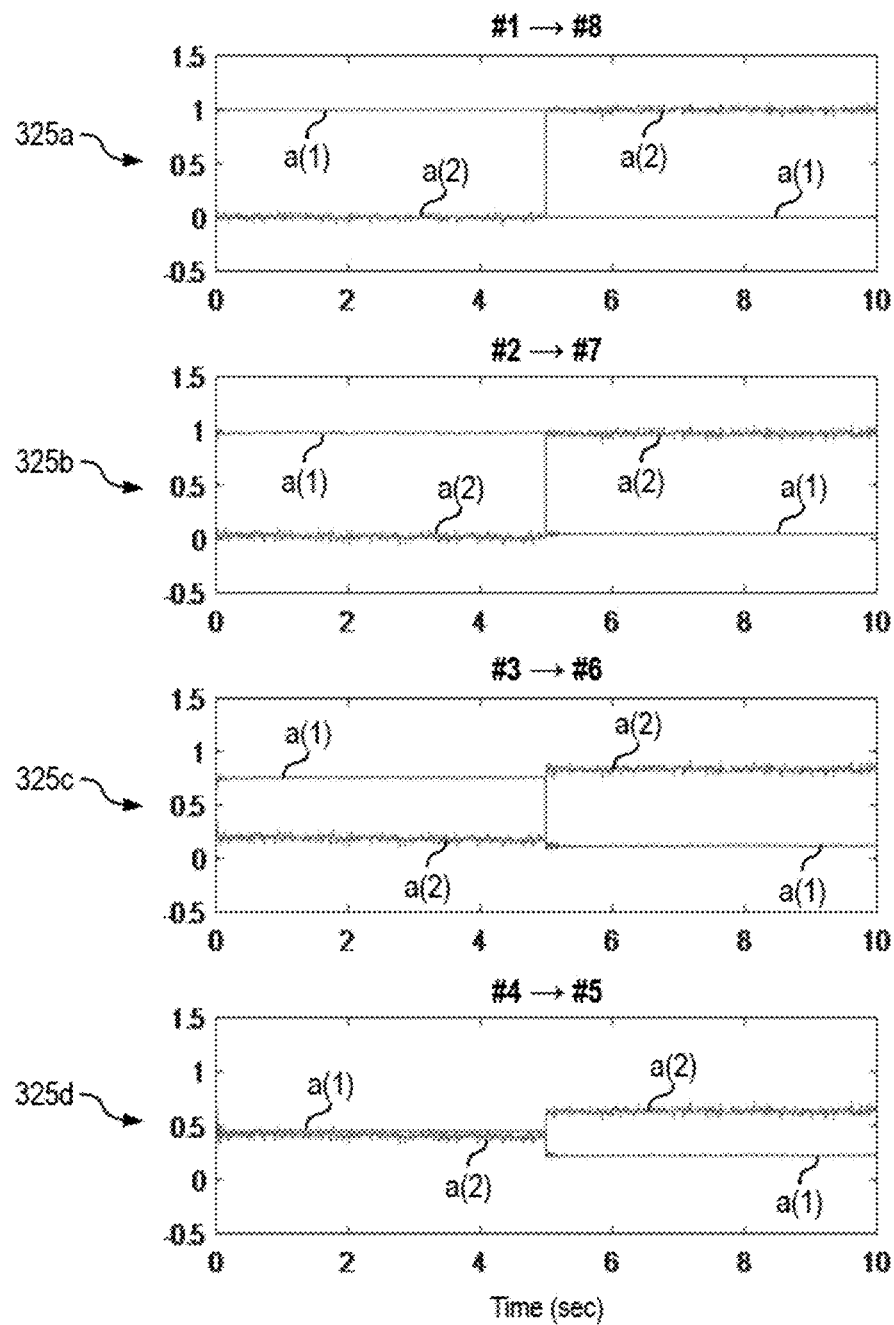

FIG. 3C illustrates plots of computed values for the vector a of mixing coefficients as the BF direction (e.g., the direction of the beamformed signal y) changes from one target 316 to another target within the BF zone specified in arrangement 305 after the 5-seconds time mark. In the plots of FIG. 3C, the element a(1) corresponds to the mixing coefficient for one of the two AEC filters stored in the matrix W, and the element a(2) corresponds to the mixing coefficient for the other of the two AEC filters stored in the matrix W. Plot 325a illustrates the computed values for the a(1) and a(2) mixing coefficients across time as the BF direction changes from target #1 to target #8 after the 5-seconds time mark. Similarly, plot 325b illustrates the computed values for the a(1) and a(2) mixing coefficients as the BF direction changes from target #2 to target #7, plot 325c illustrates the computed values for the a(1) and a(2) mixing coefficients as the BF direction changes from target #3 to target #6, and plot 325d illustrates the computed values for the a(1) and a(2) mixing coefficients as the BF direction changes from target #4 to target #5. Table 1 below illustrates the time-averaged values of a(1) and a(2) at corresponding target locations.

TABLE 1

Time-Averaged Mixing Coefficient Values

| | target # | | | | | | | |
|---|---|---|---|---|---|---|---|---|
| | 1 | 2 | 3 | 4 | 5 | 6 | 7 | 8 |
| a(1) | 1.000 | 0.982 | 0.755 | 0.451 | 0.226 | 0.120 | 0.048 | 0.000 |
| a(2) | 0.000 | 0.023 | 0.188 | 0.411 | 0.635 | 0.834 | 0.975 | 1.002 |

The values of a(1) and a(2) in FIG. 3C and in Table 1 are real values since the estimation was performed in the time domain for this particular example. It should be possible to do so in the frequency domain also such that the mixing coefficients a are complex valued, which may result in improved cancellation performance for frequency-domain AEC.

The results illustrated in FIG. 3C indicate that the values of the mixing coefficient vector a remain practically constant in a fixed direction, and that in-between values may be obtained by interpolation. Specifically, plots 325a-d show how the values of the mixing coefficients need to change when the BF switches all of a sudden (e.g., at the 5-second mark) from target #1 to target #8, from target #2 to target #7, etc. Plots 325a-d also show what coefficient values need to be used when such direction change is detected. Further, plots 325a-d show that the mixing coefficients are a function of the location of the target, that such function is continuous, and that such function can be interpolated. Thus, a practical BF+AEC solution according to the techniques described herein does not need to store the mixing coefficient vector a for all possible locations. The simulation study results reflected in FIG. 3C and Table 1 confirm that the pre-computation of the mixing coefficient values in this manner provides for a computationally effective solution that can be used on systems/devices with limited computing power. More importantly, this also shows that the AEC filters computed at the edge locations (e.g., target #1 and target #8) are sufficient for covering the entire zone (e.g., approximately 2 m distance per FIG. 3A, and approximately a 60° of angle per FIG. 3B). Thus, if a BF+AEC solution (e.g., a speakerphone) is designed to cover an entire room, then the room can be divided into six 60° zones such that only N=6 AEC filters need to be pre-computed and stored. When a filter cancellation signal needs to be generated in operation, the closest mixing coefficient vector a can be selected based on the direction angle θ, or an interpolated vector a can be computed between the two nearest mixing coefficient vectors, which is then used together with the two nearest AEC filters stored in W for background filtering.

Figure 3D:
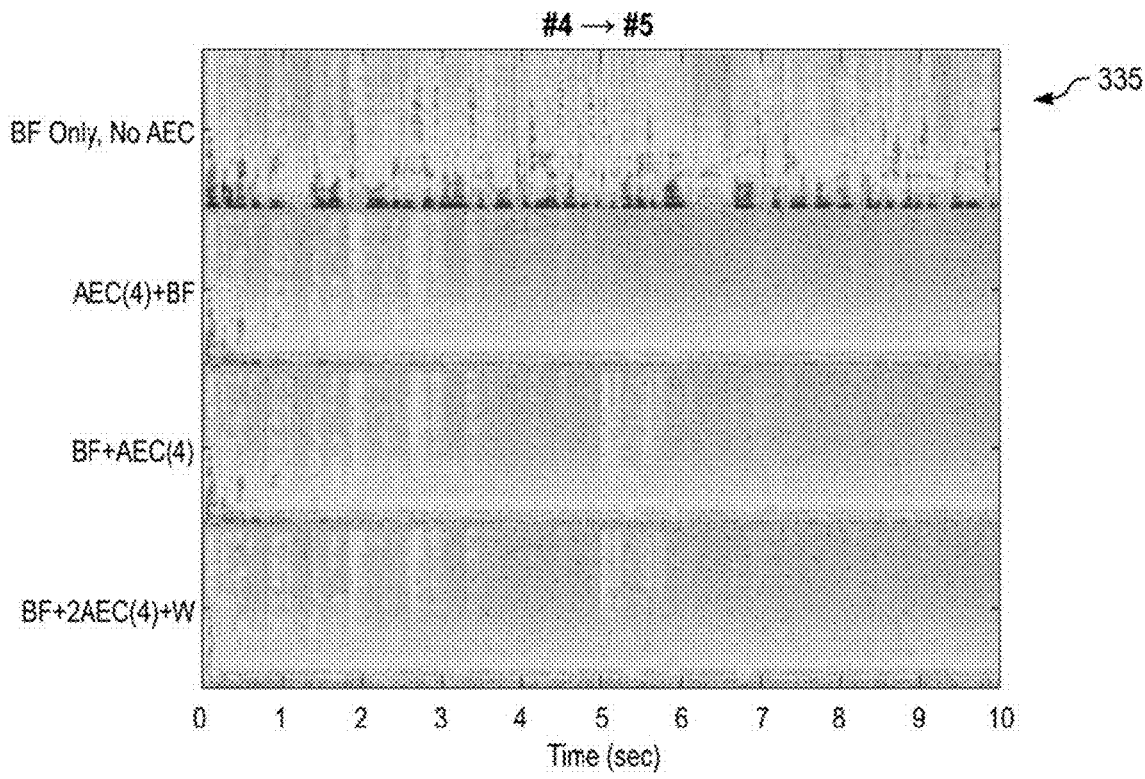

FIG. 3D illustrates spectrogram plot 335 that shows the simulation outputs from four cases when the BF direction changes from target #4 to target #5 at the 5-second mark for speech echo with car engine noise added to the echo at 20 dB signal-to-noise ratio (SNR):

Case 1: BF only, no AEC.
Case 2: AEC before BF with 4 AEC adaptations (optimal in terms of BF change).
Case 3: AEC after BF with 4 AEC adaptations.
Case 4: AEC after BF with background-foreground filtering, 4 background filter adaptations, 1 foreground filter adaptation, and storage of AEC filter coefficients computed at targets #1 and #8 (e.g., according to the techniques described herein).

With the number of AEC adaptations being equal, plot 335 illustrates that the AEC(4)+BF case and BF+AEC(4) case perform similarly until the 5-seconds mark, after which the AEC(4)+BF case (as expected) does not suffer from residual echo leakage while the BF+AEC(4) case does. On the other hand, the proposed BF+2AEC(4)+W case (e.g., a solution according to the techniques described herein) is not only capable of reducing such leakage but also achieves significantly more cancellation at the beginning than the AEC(4)+BF case. This is indicative of the general ability of the BF+2AEC(4)+W case to converge quickly by utilizing prior information. Plot 335 also shows that most of the acoustic echo below 3 kHz, where the majority of the speech energy and information resides, can be removed in the BF+2AEC(4)+W case right after the BF direction change. It should be noted that the BF direction change from target #4 to target #5, which is illustrated in FIG. 3D, is the worst-case scenario since the start point (#4) and the end point (#5) are the farthest from the zone edges (#1 and #8), so the rate of convergence at the other targets would be much higher. The best-case scenario would be changing from target #1 to target #8 since the AEC filter coefficients have already been computed at those points previously.

Figure 3E:
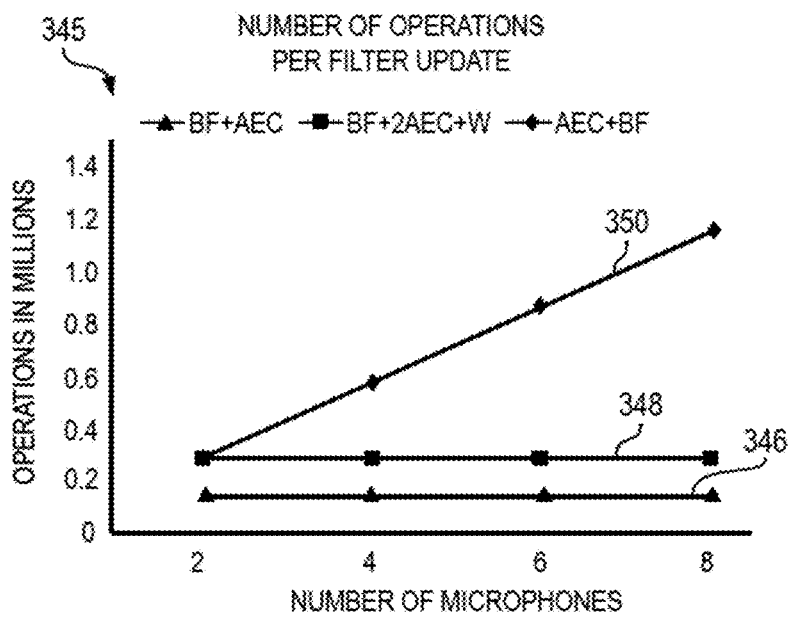

FIG. 3E illustrates plot 345 indicating the number of computational operations per filter update as a function of the number of microphones for three cases: BF+AEC, BF+2AEC+W (e.g., according to the techniques described herein), and AEC+BF. Plot 345 shows that as the number of microphones increases, the number of operations increases linearly for the conventional AEC+BF case (line 350) but remains constant for the BF+AEC (line 346) and BF+2AEC+W (line 348) cases. Thus, the simulation results reflected in plot 345 indicate that a practical BF+2AEC+W solution according to the techniques described herein provides significant reduction of computational operations when compared to a conventional AEC+BF solution for large microphone array size.

It is noted that the simulation results illustrated in FIGS. 3C-3E show that it should be sufficient to store only 6 to 8 AEC filters sampled strategically around the microphone array. Since the minimum of two of the stored filters can be used at a time by an AEC+W logic regardless of the number of microphones, the number of filters N may be increased further if the underlying device or system has enough memory in order to achieve improved spatial resolution without extra hit on computational cycles. Furthermore, the matrix W of filter coefficients may be updated from time to time if, overall, the background filter coefficient $w_b$ or the foreground filter coefficient $w_f$ provides more cancellation than the stored one when pointing in one of the chosen BF directions.

In various embodiments, the techniques for echo cancellation described herein can be applied to smartspeakers and IoT edge devices and can be implemented in firmware and/or hardware depending on availability of local device resources. A smartspeaker is a multi-media device with built-in speaker and microphone that enables human-to-machine interaction via voice commands. An IoT edge device is the entry point into IoT cloud-based services. For example, smartspeaker embodiments with more than two microphones may provide significant saving in computational cycles, while also providing "good enough" performance not only after a BF direction change but also fast convergence for all other types of echo path change while maintaining noise robustness. In IoT edge device embodiments, an IoT edge device may enhance the received speech signal for a back-end system that may be running automatic speech recognition.

In conventional BF+AEC processing, the BF focuses the microphone array's spatial response on a local talker, whereas the AEC cancels the reference signal that is recorded during playback. The techniques described herein provide several improvements to such conventional BF+AEC processing. For example, the techniques described herein provide for storage and re-use of previously computed AEC filter coefficients as a function of BF direction change, background and foreground filtering, and multiple background filter adaptations per time frame. The combination of background-foreground filtering and multiple filter adaptations not only improve cancellation performance after a BF direction change, but also achieve robustness against echo path change, background noise, and double-talk/barge-in scenarios.

In some embodiments, the matrix W of filter coefficients, the vector a of mixing coefficients and the vector b of bias coefficients can be optimized jointly, which may be algorithmically complex. In other, more simplified embodiments, the matrix W of filter coefficients and the vector a of mixing coefficients can be optimized separately from, and less often than, the vector b of bias coefficients without significant loss of optimization. In some embodiments, a BF logic may be optimized to provide undistorted output and more accurate BF direction estimate. In some embodiments, an AEC logic may be augmented with non-linear filters to account for corner cases in which there may be distortion that can't be modeled with a linear filter. For example, in some operational contexts the proximity of speaker to microphones will likely lead to non-linear acoustic echo. In such operational contexts, non-linear filters can be incorporated synergistically in the AEC logic to provide for a complete solution.

According to the techniques described herein, in some alternative embodiments the BF+AEC structure can be augmented by residual echo suppressor (RES). The RES can be configured to processes the AEC output to reduce the residual echo leakage due to a BF direction change. Traditionally, RESs are avoided for front-end processing due to non-linear artifacts, but they may provide sufficient results if integrated properly in the context of the techniques described herein (e.g., especially in contexts where voice recognition is not required).

In some embodiments, a BF can be configured to form a null beam towards a speaker in order to reduce the amount of acoustic echo that is seen by the AEC. In some embodiments, the number of stored AEC filters can be reduced for a limited room coverage (e.g., a linear microphone array installed against a wall does not need 360° coverage). In some embodiments, the techniques described herein may be implemented in automotive applications with multiple speakers and microphones installed inside a vehicle. In such embodiments, the automotive interior may be very noisy while driving, so the noise robustness of the AEC is even more important than for smartspeakers that are usually placed in relatively benign acoustic environments. In various embodiments, the techniques described herein can be implemented on various embedded devices, SoCs, and IoT devices that can be disposed into hands-free telephones, teleconferencing devices, and wireless headsets.

Figure 4:
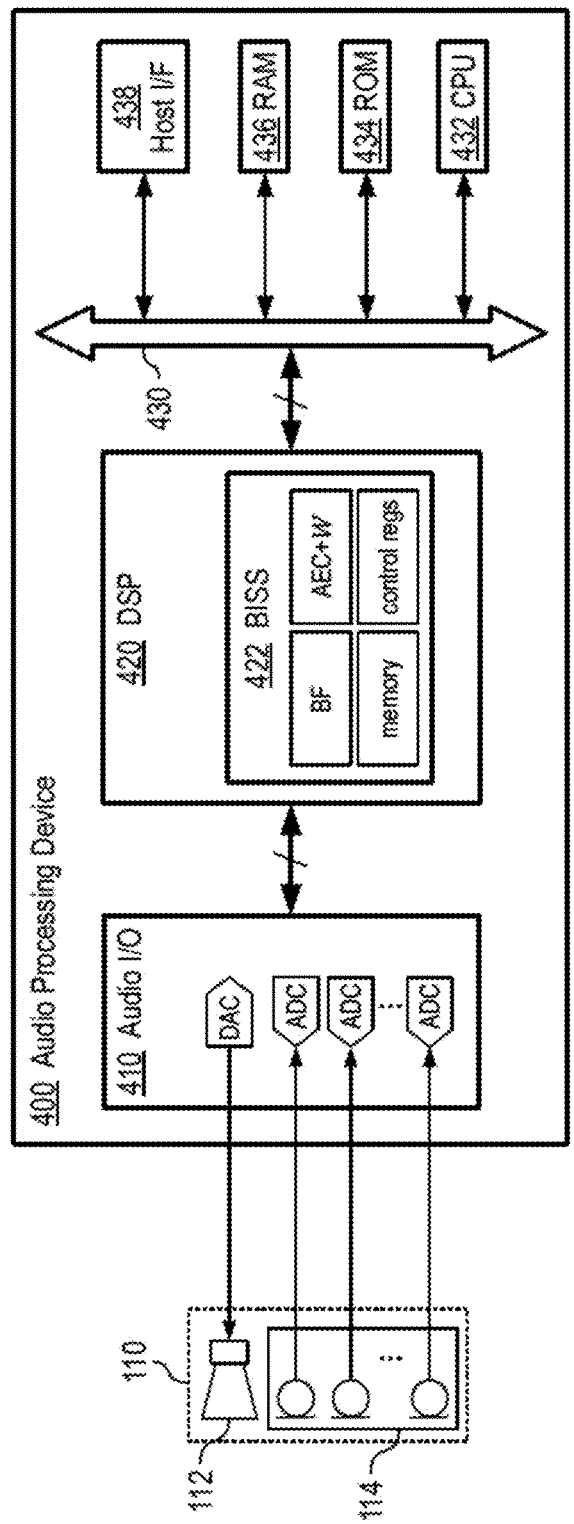
FIG. 4 illustrates a schematic diagram of an example audio processing device, in accordance with some embodiments.

The techniques for acoustic echo cancellation described herein may be implemented on various types of audio processing devices. FIG. 4 illustrates an example audio processing device that is configured in accordance with the techniques described herein. In the embodiment illustrated in FIG. 4, audio processing device 400 may be a single-chip IC device manufactured on a semiconductor die or a single-chip IC that is manufactured as a SoC. In other embodiments, audio processing device 400 may be a multi-chip module encapsulated in a single semiconductor package or multiple semiconductor packages disposed or mounted on a common substrate, such as a PCB. Thus, audio processing device 400 in FIG. 4 is to be regarded in an illustrative rather than a restrictive sense.

Among other components, processing device 400 includes audio I/O logic 410, DSP 420, CPU 432, read-only memory (ROM) 434, random access memory (RAM) 436, and host interface 438. DSP 420, CPU 432, ROM 434, RAM 436, and host interface 438 are coupled to one or more buses 430. DSP 420 is also coupled to audio I/O logic 410 over a single-channel or multi-channel bus. Audio I/O logic 410 is coupled to speaker-microphone assembly 110.

Speaker-microphone assembly 110 includes a speaker 112 and a microphone array 114. Microphone array 114 includes multiple microphones that are disposed to detect acoustic waves from wanted sound sources (e.g., human speech), but can also detect/record acoustic waves from unwanted sound sources (e.g., such as echo from speaker 112). Speaker 112 is coupled to digital-to-analog converter (DAC) circuitry in audio I/O logic 410. Speaker 112 is configured to receive an analog audio signal from the DAC circuitry, and to emit the audio signal as an acoustic wave. Microphone array 114 is coupled to analog-to-digital converter (ADC) circuitry in audio I/O logic 410. Microphone array 114 is configured to receive acoustic waves from various sound sources and to convert them into analog audio signals that are sent to the ADC circuitry. In some embodiments, some or all of the microphones in microphone array 114 may share the same communication channel to the ADC circuitry in audio I/O logic 410 through suitable multiplexers and buffers. In other embodiments, each microphone in microphone array 114 may have a separate communication channel to, and a separate instance of, the ADC circuitry in audio I/O logic 410. In some embodiments (e.g., smartphones), speaker 112 and microphone array 114 may be integrally formed as the same assembly 110. In some embodiments, (e.g., teleconferencing devices), speaker 112 and microphone array 114 may be separate components that are disposed on a common substrate (e.g., a PCB) mounted within, or on, a housing of assembly 110. In yet other embodiments, assembly 110 may not have a housing but may be formed by virtue of the acoustic proximity of speaker 112 to microphone array 114.

Audio I/O logic 410 includes various logic blocks and circuitry configured to process signals that are transferred between DSP 420 and speaker-microphone assembly 110. For example, audio I/O logic 410 includes DAC circuitry and ADC circuitry. The DAC circuitry includes DACs, amplifiers, and other circuits suitable for signal processing (e.g., circuits for input-matching, amplitude limiting, compression, gain control, parametric or adaptive equalizing, phase shifting, etc.) configured to receive a modulated digital signal from DSP 420 and convert it to an analog audio signal for speaker 112. The ADC circuitry includes ADCs, amplifiers, and other circuits suitable for signal processing (e.g., circuits for input-matching, amplitude limiting, compression, gain control, parametric or adaptive equalizing, phase shifting, etc.) configured to receive analog audio signals from the microphones in microphone array 114 and to convert them to modulated digital signals that are sent to DSP 420.

DSP 420 includes various logic blocks and circuitry configured to process digital signals that are transferred between audio I/O logic 410 and various components coupled to bus(es) 430. For example, DSP 420 includes circuitry configured to receive digital audio data (e.g., a series of bytes) from other components in processing device 400 and to convert the received audio data into modulated digital signals (e.g., a stream of bits) that are send to audio I/O logic 410. DSP 420 also includes circuitry configured to receive modulated digital signals from audio I/O logic 410 and to convert the received signals into digital audio data. In the embodiment illustrated in FIG. 4, DSP 420 includes a Barge-In Sub-System (BISS) logic 422. BISS logic 422 includes a BF logic block and an AEC logic block configured according to the acoustic echo cancellation techniques described herein. BISS logic 422 also includes control registers configured to control operation of the BF and AEC logic blocks, as well as shared memory (e.g., RAM) to share signal data within its logic blocks and with other blocks of DSP 420 and/or with various components in processing device 400. BISS logic 422 may also include a programmable state machine (PSM). The PSM may be implemented as a micro-coded engine that includes its own a microcontroller, which can fetch instructions from microcode memory and use the shared memory to obtain operands for its instructions. The PSM is configured to exercise fine-grained control over the hardware circuitry by programming internal hardware registers (IHR) that are co-located with the hardware functions they control.

Bus(es) 430 may include one or more buses such as a system interconnect and a peripheral interconnect. The system interconnect may be a single-level or multi-level Advanced High-Performance Bus (AHB) that is configured as an interface that couples CPU 432 to the other components of processing device 400, as well as a data and control interface between the various components and the peripheral interconnect. The peripheral interconnect may be an Advanced eXtensible Interface (AXI) bus that provides the primary data and control interface between CPU 432 and its peripherals and other resources (e.g., system resources, I/O blocks, direct memory access (DMA) controllers, etc.), which may be programmed to transfer data between peripheral blocks without burdening the CPU.

CPU 432 includes one or more processing cores configured to execute instructions that may be stored in ROM 434, RAM 436, or flash memory (not shown). ROM 434 is read-only memory (or other suitable non-volatile storage medium) that is configured for storing boot-up routines, configuration parameters, and other firmware parameters and settings. RAM 436 is volatile memory that is configured for storing data and firmware instructions accessed by CPU 432. A flash memory, if present, may be embedded or external non-volatile memory (e.g., NAND flash, NOR flash, etc.) that is configured for storing data, programs, and/or other firmware instructions.

Host interface 438 may include control registers, data registers, and other circuitry configured to transfer data between DSP 420 and a host (not shown). The host may be a microcontroller subsystem disposed on-chip, an off-chip IC device (such as a SoC), and/or an external computer system. The host may include its own CPU that is operable to execute host applications or other firmware/software configured (among other functions) to send, receive, and/or process audio data. In some embodiments, multiple communication circuitry and/or hosts may be instantiated on the same processing device 400 to provide communications over various protocols (e.g., such as Bluetooth and/or wi-fi) for audio and/or other signals that are sent, received, or otherwise processed by device 400. In some embodiments (e.g., such as a smartphone), an application processor (AP) may be instantiated as an on-chip host coupled to interface 438 to provide for execution of various applications and software programs.

In operation, DSP 420 receives audio data (e.g., a series of bytes) over bus(es) 430 (e.g., from host interface 438). DSP 420 converts the received audio data into a modulated digital signal (e.g., a stream of bits) that is sent to BISS logic 422 as a reference signal x. The modulated digital signal is also sent to audio I/O logic 410. Audio I/O logic 410 converts the received digital signal into an analog audio signal that is sent to speaker 112. The microphones in microphone array 114 pick up acoustic waves from near-end speech as well as acoustic echo (if any) from speaker 112. The microphones in microphone array 114 convert the received acoustic waves into corresponding analog audio signals that are sent to audio I/O logic 410. Audio I/O logic 410 converts the received analog audio signals into modulated digital signals d that are sent to BISS logic 422 in DSP 420.

According to the techniques described herein, BISS logic 422 applies its BF logic block on the received digital signals d to combine them into a beamformed signal y. The generated beamformed signal y is sent to the AEC+W logic block of BISS logic 422 along with its direction angle θ. The AEC+W logic block applies a background filter to the beamformed signal y and to the reference signal x, in order to generate a background cancellation signal $e_b$. For example, based on the direction angle θ, the AEC+W logic block retrieves a subset of matrix W of pre-computed filter coefficients and a subset of vector a of mixing coefficients from look-up tables in the shared memory. The AEC+W logic block then computes a background filter coefficient $w_b$ multiple times per time frame (e.g., in accordance with Equation (4) above). The AEC+W logic block then applies a background filter to the beamformed signal y and the reference signal x based on the background filter coefficient $w_b$ (e.g., in accordance with Equation (5) above), in order to generate the background cancellation signal $e_b$. The AEC+W logic block also applies a foreground filter $w_f$ to the beamformed signal y and to the reference signal x (e.g., in accordance with Equation (6) above), in order to generate the foreground cancellation signal $e_f$. The AEC+W logic block then generates the output signal e based on the background cancellation signal $e_b$ and the foreground cancellation signal $e_f$. For example, in some embodiments the AEC+W logic block may select the cancellation signal (either $e_b$ or $e_f$) with the lower residual signal energy as the output signal e. In other embodiments, the AEC+W logic block may generate the output signal e by giving each of cancellation signals $e_b$ and $e_f$ different weights and then combining them accordingly.

In some embodiments, the AEC+W logic block of BISS 422 may be configured to periodically re-compute and update the coefficient values in matrix W and in vector a. For example, the AEC+W logic block (and/or another logic block in BISS 422) may be configured to re-compute the matrix W and the vector a periodically and/or in response to a calibration command.

Figure 5:
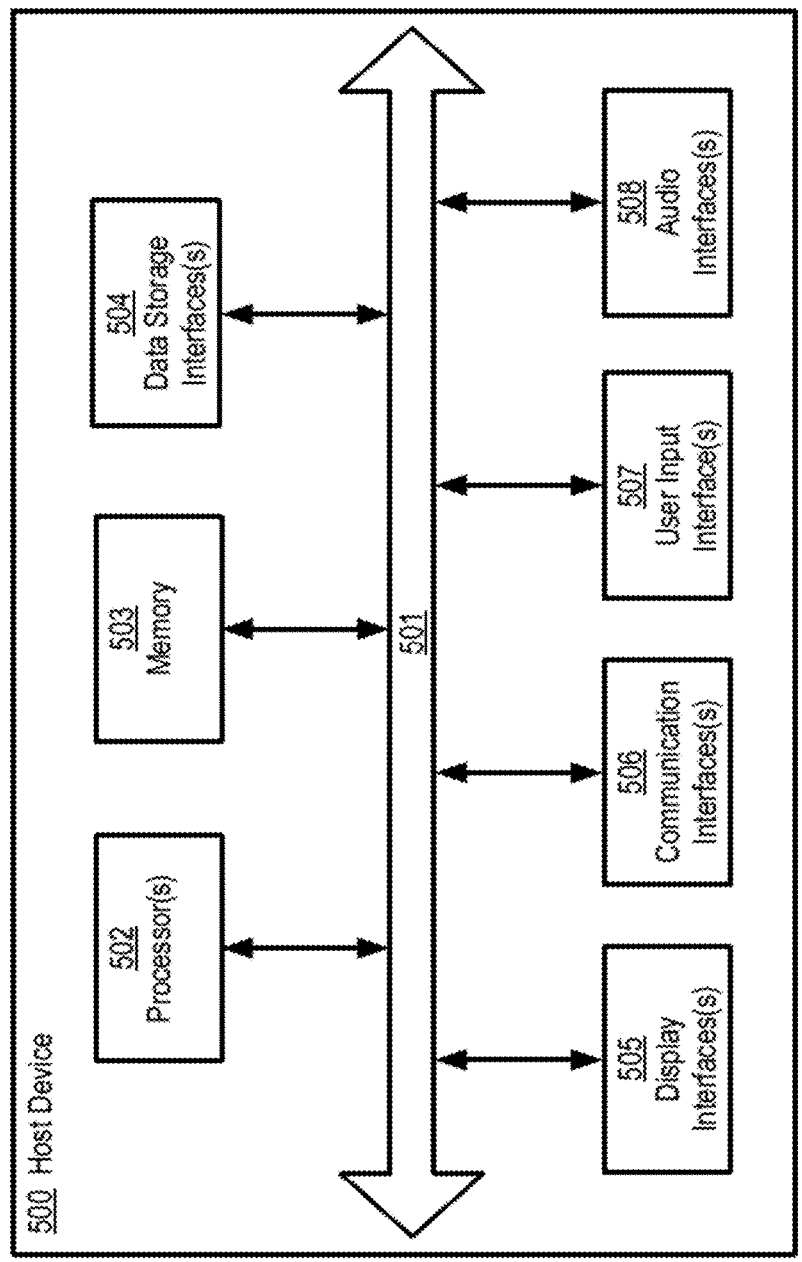
FIG. 5 illustrates a schematic diagram of an example host device, in accordance with some embodiments.

FIG. 5 is a block diagram illustrating host device 500, in accordance with various embodiments. Host device 500 may fully or partially include, and/or operate, the host 140 in FIG. 1 and/or be coupled to the audio processing device 400 of FIG. 4 through host interface 438. The host device 500 illustrated in FIG. 5 may operate as a standalone device or may be connected (e.g., networked) to other machines. In a networked deployment, host device 500 may be implemented as a server blade in could-based physical infrastructure, as a server or a client machine in server-client network, as a peer machine in a P2P (or distributed) network, etc.

Host device 500 may be embodied in various form factors (e.g., an on-chip device, a computer system, etc.) within which sets of instructions may be executed to cause host device 500 to perform one or more of the operations and functionalities described herein. For example, in various embodiments host device 500 may be a SoC device, an IoT device, a server computer, a server blade, a client computer, a personal computer (PC), a tablet, a set-top box (STB), a Personal Digital Assistant (PDA), a smartphone, a web appliance, a speakerphone, a handheld multi-media device, a handheld video player, a handheld gaming device, or any other machine capable of executing a set of instructions (sequential or otherwise) that specify actions to be taken by that machine. When host device 500 is embodied as an on-chip device (e.g., a SoC, an IoT device, etc.), its illustrated components may reside on a common carrier substrate such as, for example, an IC die substrate, a multi-chip module substrate, or the like. When host device 500 is embodied as a computer system (e.g., a server blade, a server computer, a PC, etc.), its illustrated components may be separate integrated circuits and/or discrete components that are disposed on one or more PCB substrates. Further, while only a single host device 500 is illustrated in FIG. 5, in various operational contexts the term "device" may also be commonly understood to include any collection of machines that individually or jointly execute a set (or multiple sets) of instructions to perform any one or more of the operations and functionalities described herein.

Host device 500 includes processor(s) 502, memory 503, data storage interface(s) 504, display interface(s) 505, communication interface(s) 506, user input interface(s) 507, and audio interface(s) 508 that are coupled to one or more busses 501. When host device 500 is embodied as an on-chip device, bus(es) 501 may include one or more on-chip buses such as a system interconnect (e.g., a single-level or multi-level AHB) and a peripheral interconnect (e.g., an AXI bus). When host device 500 is embodied as a computer system, bus(es) 501 may include one or more computer buses such as chipset north/south bridges (that mediate communications between processor(s) 502 and the other components) and various peripheral buses (e.g., PCI, Serial ATA, etc., that mediate communications to various computer peripherals).

Host device 500 includes processor(s) 502. When host device 500 is embodied as an on-chip device, processor(s) 502 may include an ARM processor, a RISC processor, a microprocessor, an application processor, a controller, special-purpose processor, a DSP, an ASIC, an FPGA, or the like. When host device 500 is embodied as a computer system, processor(s) 502 may include one or more CPUs.

Host device 500 also includes memory 503. Memory 503 may include non-volatile memory (e.g., ROM) for storing static data and instructions for processor(s) 502, volatile memory (e.g., RAM) for storing data and executable instructions for processor(s) 502, and/or flash memory for storing firmware (e.g., control algorithms) executable by processor(s) 502 to implement at least a portion of operations and functionalities described herein. Portions of memory 503 may also be dynamically allocated to provide caching, buffering, and/or other memory-based functionalities. Memory 503 may also include removable memory devices that may store one or more sets of software instructions. Such software instructions may also be transmitted or received over a network via the communication interface(s) 506. Software instructions may also reside, completely or at least partially, on a non-transitory computer-readable storage medium and/or within the processor(s) 502 during execution thereof by host device 500.

Host device 500 also includes data storage interface(s) 504. Data storage interface(s) 504 are configured to connect host device 500 to storage devices that are configured for persistently storing data and information that is used by host device 500. Such data storage devices may include persistent storage media of various media types including, but not limited to, electromagnetic disks (e.g., hard disks), optical storage disks (e.g., CD-ROMs), magneto-optical storage disks, solid-state drives, Universal Serial Bus (USB) flash drives, and the like.

Host device 500 also includes display interface(s) 505 and communication interface(s) 506. Display interface(s) 505 are configured to connect host device 500 to display devices (e.g., a liquid crystal display (LCD), touchscreens, computer monitors, TV screens, etc.), and to provide software and hardware support for display interface protocols. Communication interface(s) 506 are configured to transmit and receive data to and from other computing systems/devices. For example, communication interface(s) 506 may include a USB controller and bus for communicating with USB peripheral devices, a network interface card (NIC) for communicating over wired communication networks, and/or wireless network card that can implement a variety of wireless data-transmission protocols such as IEEE 802.11 (wi-fi) and Bluetooth.

Host device 500 also includes user input interface(s) 507 and audio interface(s) 508. User input interface(s) 507 are configured to connect host device 500 to various input devices such as alphanumeric input devices (e.g., a touch-sensitive or typewriter-style keyboard), a pointing device that provides spatial input data (e.g., a computer mouse), and/or any other suitable human interface device that can communicate user commands and other user-generated information to processor(s) 502. Audio interface(s) 508 are configured to connect host device 500 to various audio devices (e.g., microphones, speakers, etc.) and to provide software and hardware support for various audio input/output.

Various embodiments of the techniques for acoustic echo cancellation described herein may include various operations. These operations may be performed and/or controlled by hardware components, digital hardware and/or firmware, and/or combinations thereof. As used herein, the term "coupled to" may mean connected directly or connected indirectly through one or more intervening components. Any of the signals provided over various on-chip buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for acoustic echo cancellation. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A system comprising:
   a speaker configured to receive a reference signal;
   a microphone array comprising multiple microphones;
   a beamformer (BF) logic configured to receive audio signals from the multiple microphones and to generate a beamformed signal; and
   acoustic echo canceller (AEC) logic configured to receive the beamformed signal and the reference signal, wherein the AEC logic is configured at least to:
   compute a vector of bias coefficients multiple times per time frame;
   compute a background filter coefficient based on the vector of bias coefficients, a matrix of filter coefficients, and a vector of mixing coefficients;
   apply a background filter to the reference signal and the beamformed signal based on the background filter coefficient, to generate a background cancellation signal; and generate an output signal based at least on the background cancellation signal.

2. The system of claim 1, wherein the AEC logic is further configured to:
apply a foreground filter to the reference signal and the beamformed signal based on a foreground filter coefficient, to generate a foreground cancellation signal.

3. The system of claim 2, wherein the output signal is generated based on both the background cancellation signal and the foreground cancellation signal.

4. The system of claim 2, wherein to generate the output signal the AEC logic is configured to select one of the background cancellation signal and the foreground cancellation signal based on residual signal energy.

5. The system of claim 1, wherein the matrix of filter coefficients and the vector of mixing coefficients are pre-computed and stored in one or more look-up tables.

6. The system of claim 1, wherein the AEC logic is further configured to re-compute the matrix of filter coefficients and the vector of mixing coefficients periodically or in response to a calibration command.

7. The system of claim 1, wherein the AEC logic is further configured to:
receive, from the BF logic, a direction angle associated with the beamformed signal; and
select the matrix of filter coefficients and the vector of mixing coefficients based on the direction angle.

8. The system of claim 1, further comprising a host configured to receive the output signal from the AEC logic.

9. The system of claim 8, wherein the host is configured to:
generate the reference signal by applying the output signal thereto; and
provide the reference signal to the speaker and the AEC logic.

10. The system of claim 8, wherein the host is further configured to perform voice recognition.

11. The system of claim 8, wherein the BF logic and the AEC logic are disposed on a semiconductor device that is coupled to the host over a network.

12. The system of claim 1, wherein the system is one of a speakerphone, a smartspeaker, a smartphone, and a wireless headset.

13. A method for acoustic echo cancellation between a speaker and a microphone array, the method comprising:
receiving audio signals from multiple microphones in the microphone array;
generating a beamformed signal based on the audio signals;
receiving a reference signal that is sent to the speaker;
computing, by a processing device, a vector of bias coefficients multiple times per time frame;
computing, by the processing device, a background filter coefficient based on the vector of bias coefficients, a matrix of filter coefficients, and a vector of mixing coefficients;
generating, by the processing device, a background cancellation signal by applying a background filter to the reference signal and the beamformed signal based on the background filter coefficient; and
generating, by the processing device, an output signal based at least on the background cancellation signal.

14. The method of claim 13, further comprising generating, by the processing device, a foreground cancellation signal by applying a foreground filter to the reference signal and the beamformed signal based on a foreground filter coefficient.

15. The method of claim 14, wherein generating the output signal comprises generating the output signal based on both the background cancellation signal and the foreground cancellation signal.

16. The method of claim 14, wherein generating the output signal comprises selecting one of the background cancellation signal and the foreground cancellation signal based on residual signal energy.

17. The method of claim 13, further comprising retrieving, by the processing device, the matrix of filter coefficients and the vector of mixing coefficients from one or more pre-computed look-up tables.

18. The method of claim 13, further comprising re-computing and storing the matrix of filter coefficients and the vector of mixing coefficients by the processing device.

19. The method of claim 13, further comprising re-computing, by the processing device, the matrix of filter coefficients and the vector of mixing coefficients periodically or in response to a calibration command.

20. The method of claim 13, further comprising:
determining, by the processing device, a direction angle associated with the beamformed signal; and
selecting, by the processing device, the matrix of filter coefficients and the vector of mixing coefficients based on the direction angle.

21. A semiconductor device for audio processing, the semiconductor device comprising:
a beamformer (BF) logic configured to receive audio signals from multiple microphones in a microphone array and to generate a beamformed signal; and
acoustic echo canceller (AEC) logic configured to receive the beamformed signal and a reference signal that is sent to a speaker, wherein the AEC logic is configured at least to:
compute a vector of bias coefficients multiple times per time frame;
compute a background filter coefficient based on the vector of bias coefficients, a matrix of filter coefficients, and a vector of mixing coefficients;
apply a background filter to the reference signal and the beamformed signal based on the background filter coefficient, to generate a background cancellation signal; and
generate an output signal based at least on the background cancellation signal.

22. The semiconductor device of claim 21, wherein the AEC logic is further configured to:
apply a foreground filter to the reference signal and the beamformed signal based on a foreground filter coefficient, to generate a foreground cancellation signal.

23. The semiconductor device of claim 22, wherein the output signal is generated based on both the background cancellation signal and the foreground cancellation signal.

24. The semiconductor device of claim 22, wherein to generate the output signal the AEC logic is configured to select one of the background cancellation signal and the foreground cancellation signal based on residual signal energy.

25. The semiconductor device of claim 21, wherein the matrix of filter coefficients and the vector of mixing coefficients are pre-computed and stored in one or more look-up tables.

26. The semiconductor device of claim 21, wherein the AEC logic is further configured to re-compute the matrix of filter coefficients and the vector of mixing coefficients periodically or in response to a calibration command.

27. The semiconductor device of claim 21, wherein the AEC logic is further configured to:
  receive, from the BF logic, a direction angle associated with the beamformed signal; and
  select the matrix of filter coefficients and the vector of mixing coefficients based on the direction angle.

28. The semiconductor device of claim 21, further comprising a digital signal processor (DSP) that includes the BF logic and the AEC logic.

* * * * *